Jan. 16, 1968 E. A. GESSNER 3,364,321
CONDITION SENSING AND CONTROLLING SWITCH DEVICE
Filed Nov. 29, 1965 3 Sheets-Sheet 1
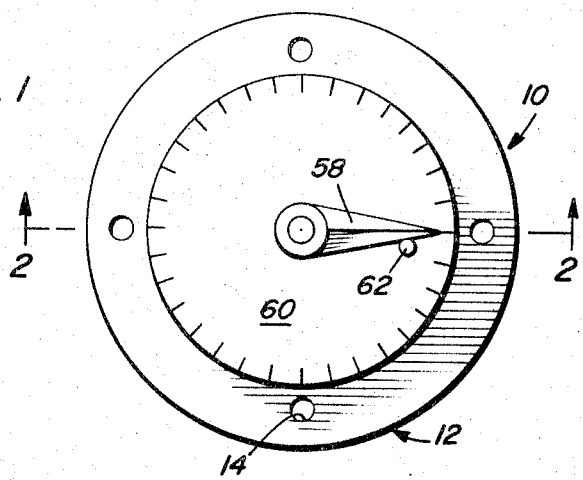
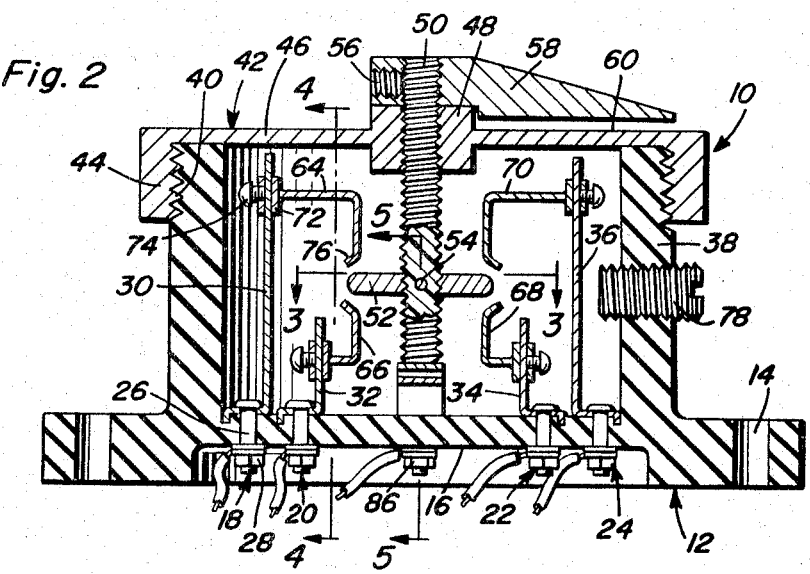
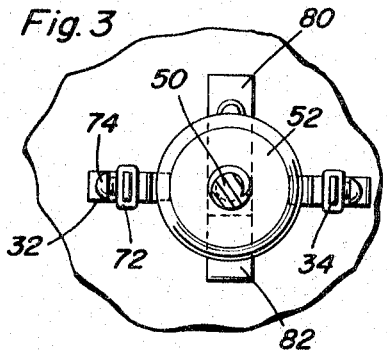
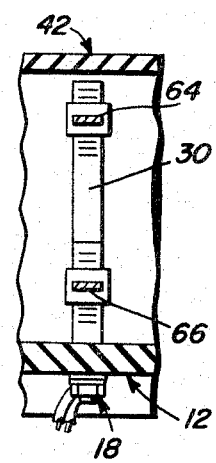
Ernest A. Gessner
INVENTOR.
BY *Clarence A. O'Brien*
and *Harvey B. Jacobson*
Attorneys

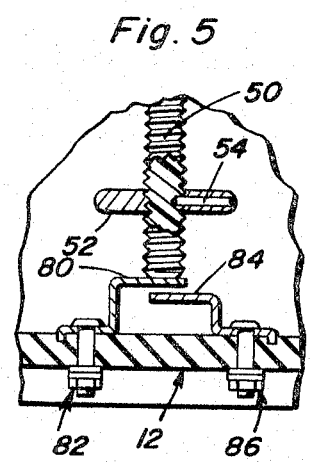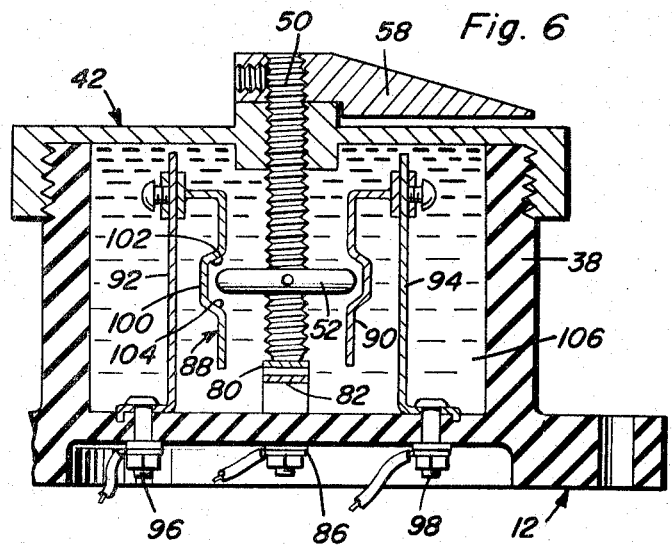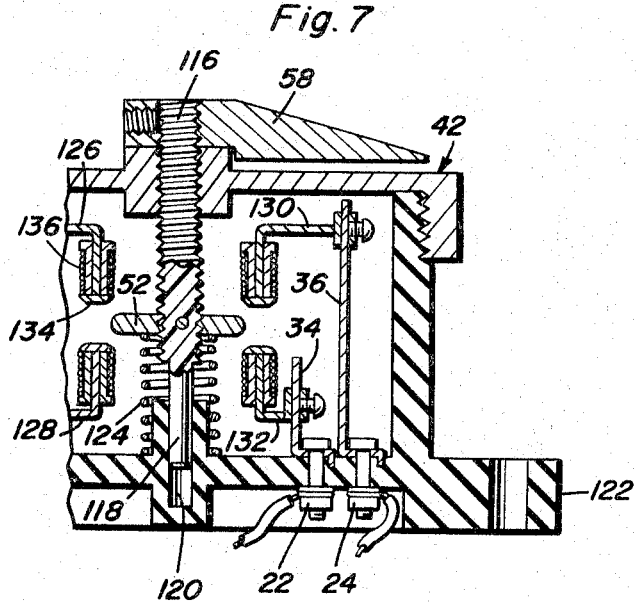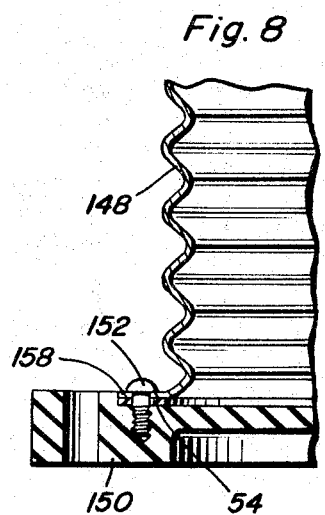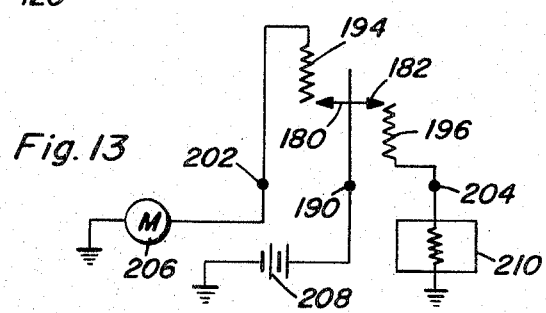

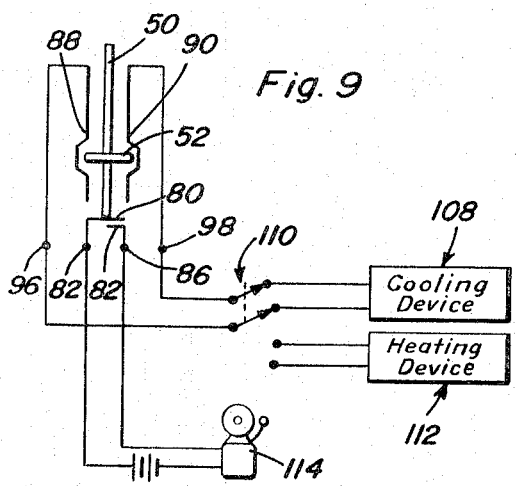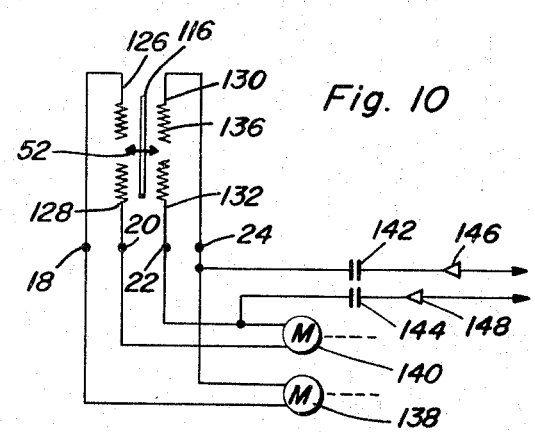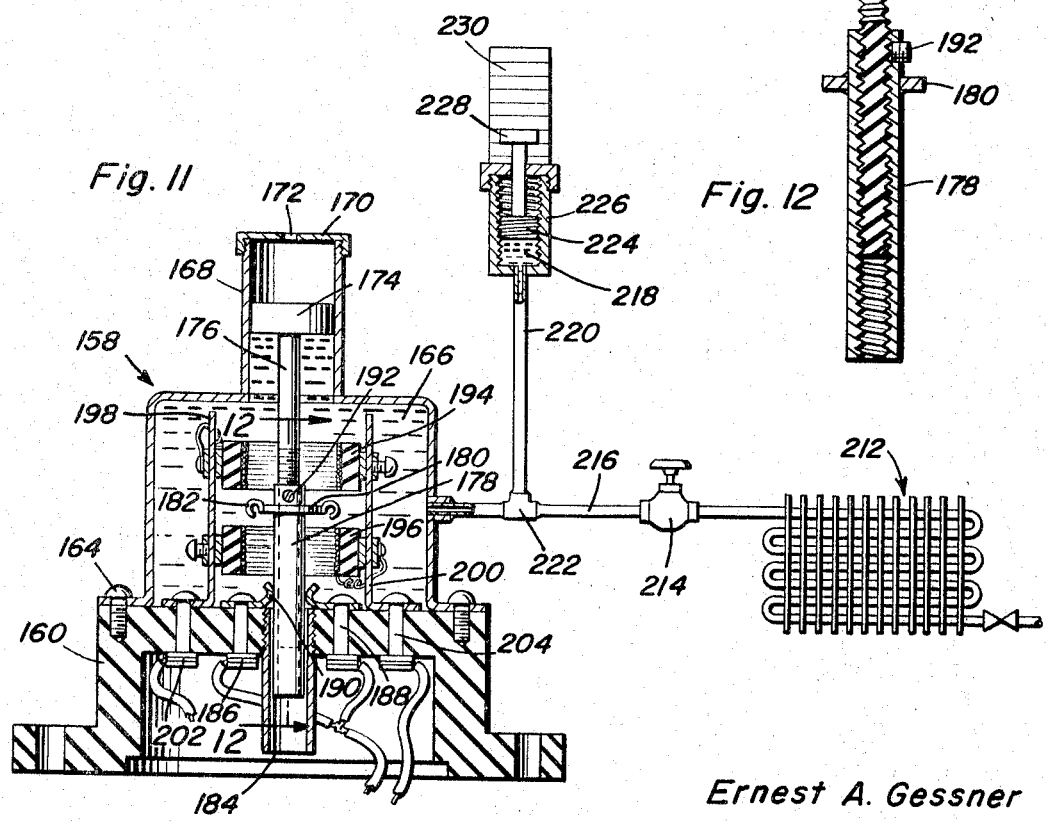

United States Patent Office 3,364,321
Patented Jan. 16, 1968

3,364,321
CONDITION SENSING AND CONTROLLING
SWITCH DEVICE
Ernest A. Gessner, 4130 Flory Ave.,
El Paso, Tex. 79904
Filed Nov. 29, 1965, Ser. No. 510,181
19 Claims. (Cl. 200—83)

ABSTRACT OF THE DISCLOSURE

A fluid pressure responsive switch assembly, the contact establishing elements of which are enclosed within a fluid-tight housing sealed by a pressure sensitive component to position a contact disc between fixedly spaced contact surfaces within the housing for given internal and external pressure conditions. The position of the contact disc may be adjusted relative to the contact surfaces by facilities outside of the housing which will also register the adjusted position. Various control circuits may be established through the switch assembly by terminals to which the contact surfaces are electrically connected.

---

This invention relates to a new and useful switch construction and more particularly to a switch device for controlling a plurality of electrical circuits in accordance with variations in temperature and/or pressure.

The primary object of the present invention is to provide a switch device capable of serving several and varied functions which involve the sensing changes in temperature and/or pressure.

An additional object of the present invention is to provide a temperature and/or pressure sensing switch device capable of controlling the operation of cooling and heating systems as well as to provide an alarm should an extreme condition be sensed.

A further object of the present invention is to provide a condition sensing switch and circuit controlling device, the operation of which may be adjusted in order to suit different installational requirements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of switch device constructed in accordance with the present invention.

FIGURE 2 is a sectional view through the switch device taken substantially through a plane indicated by section line 2—2 of FIGURE 1.

FIGURE 3 is a partial sectional view taken substantially through a plane indicated by section line 3—3 in FIGURE 2.

FIGURE 4 is a partial sectional view taken substantially through a plane indicated by section line 4—4 in FIGURE 2.

FIGURE 5 is a partial sectional view taken substantially through a plane indicated by section line 5—5 in FIGURE 2.

FIGURE 6 is a sectional view through a modified form of switch service.

FIGURE 7 is a partial sectional view through another modified form of switch device.

FIGURE 8 is a partial sectional view through yet another form of switch device.

FIGURE 9 is an electrical circuit diagram illustrating an electrical circuit installation for a switch device of the type illustrated in FIGURE 6.

FIGURE 10 is an electrical circuit diagram illustrating an electrical installation for a switch device of the type illustrated in FIGURE 7.

FIGURE 11 is a sectional view through a still further modified form of switch device constructed in accordance with the present invention.

FIGURE 12 is a partial sectional view taken substantially through a plane indicated by section line 12—12 in FIGURE 11.

FIGURE 13 is an electrical circuit diagram showing an electrical installation for the switch device of the type shown in FIGURE 11.

Referring now to the drawings in detail, FIGURES 1 and 2 illustrate one form of switch device generally denoted by reference numeral 10. The switch device is provided with a base portion 12 made of a suitable dielectric material. The base portion is provided with circumferntially spaced apertures 14 so that it may be secured on a mounting surface and is provided with a circular recess 16 on the underside in order to accommodate a plurality of terminal assemblies 18, 20, 22 and 24. Each terminal assembly includes a threaded pin 26 received through an aperture formed in the base portion. A nut 28 is threadedly mounted on the threaded portion of the pin projecting downwardly from the base portion within the recess 16 so as to clamp the bared end of an electrical wire against a washer in order to establish a suitable electrical connection to vertically extending support elements 30, 32, 34 and 36 enclosed within cylindrical housing portion 38.

The housing portion 38 in the construction illustrated in FIGURES 1 and 2, is a rigid integral extension of the base portion. The upper end of the housing portion is externally threaded at 40 so as to threadedly mount a closure cap 42 in order to seal within the housing portion, a fluid medium. The closure cap is therefore provided with an annular skirt portion 44 and an elastically deformable top portion 46. Thus, the closure cap is made of a suitable elastic material such that the top portion will undergo axial displacement in response to volumetric changes in the fluid medium sealed within the housing portion. The fluid medium may either be a gas or an incompressible liquid such as oil. The top portion 46 of the closure cap is formed centrally with an internally threaded mounting boss 48. Thus, the boss is located at a portion of the closure cap which undergoes maximum displacemnt in response to volumetric changes in the fluid medium, these changes occurring as a result of variations in the pressure or temperature being monitored.

The closure cap 42 mounts by means of its central boss 48, an externally threaded rod 50 made of a dielectric material. The rod 50 projects centrally into the housing portion 38 within the fluid medium and mounts therewithin a circular contact disk member 52 as shown in FIGURES 2, 3 and 5. The contact disk member 52 is provided with an internally threaded aperture for receiving the rod 50 and is locked in axially adjusted position thereon by means of a setscrew element 54. Also secured to the rod externally of the housing by means of a setscrew 56, is an indicator pointer 58. The indicator pointer cooperates with a scale 60 formed on the top surface of the closure cap as shown in FIGURES 1 and 2 in order to register the axial position of the contact disk member 52 within the housing. It will be apparent, that the axial position of the contact disk member may be varied by virtue of the axial movement imparted to the rod member as it is rotated by the pointer away from its position abutting the stop 62.

The contact disk member 52 is initially positioned at a neutral position out of contact with any of the spring contact elements 64, 66, 68 and 70. Each of the contact elements is adjustably mounted on an associated support element 30, 32, 34 and 36 by means of a sleeve 72 and setscrew 74. Thus, the upper contact elements 64 and 70 present contact surface portions 76 adapted to be electrically bridged by the contact disk member 52 in response to upward displacement of the rod 50. Axially spaced from the contact surface portions 76 associated with the contact elements 64 and 70 are the contact surface portions of the lower contact elements 66 and 68 also adapted to be electrically bridged by the contact disk member 52 in response to downward axial displacement of the rod 50. It will therefore be apparent that the switch device may be adjusted internally of the housing portion by adjustable positioning of the contact elements on the support elements in order to properly space the aligned contact surface portions of the contact elements on either side of the contact disk member 52. The position of the contact disk member 52 may also be adjusted externally of the switch device by means of the indicator pointer 58 as aforementioned. Also, operational adjustment may be effected by varying the internal volume of the housing portion by means of the axially positioned setscrew member 78 threadedly mounted in the housing portion 38. The member 78 when projected axially into the enclosure of the housing or axially withdrawn therefrom, will vary the internal volume.

Referring now to FIGURES 2 and 5, it will be noted that an axial bias is imposed on the rod member 50 in an upward direction by means of a spring contact element 80 secured to the base portion 12 by means of an electrical terminal 82. Closely spaced from the spring contact element 80 below the rod 50 is a second spring contact element 84 secured in position on the base by means of the electrical terminal 86. Accordingly, axial displacement of the rod 50 by an excessive amount in a downward direction will close the contact elements 80 and 84 in order to complete an alarm circuit for example.

In FIGURE 6, another form of switch device is illustrated which is similar in construction to the switch device 10 except for the arrangement and mounting of the contact elements. One pair of unitary contact elements 88 and 90 are respectively supported in adjusted position on either side of the contact disk member 52 by means of the parallel spaced support elements 92 and 94. The support elements 92 and 94 are therefore mounted on the base 12 by means of the terminals 96 and 98 just as described in connection with the support elements within the switch device 10. Each of the contact elements 88 and 90 is provided with an offset portion 100 so as to present axially spaced contact surfaces 102 and 104 on either side of the contact disk member 52 when disposed in its neutral position shown in FIGURE 6. Thus, axial displacement of the contact disk member in either direction will complete the same conductive path between the terminals 96 and 98 whereas two separate conductive paths are completed in response to axial displacement of the contact disk member 52 in either direction in the case of the switch device 10 of FIGURES 1–5. Also, the switch device of FIGURE 6 will complete an alarm circuit by means of contact elements 80 and 82 when the rod member 50 is axially displaced in one direction by an excessive amount.

A switch device such as illustrated in FIGURE 6 may be utilized in connection with a combined heating and cooling system as shown in FIGURE 9. When the fluid medium 106 within the housing portion 38 as illustrated in FIGURE 6, is volumetrically expanded because of a rise in temperature for example, the closure cap 42 will be axially displaced upwardly so as to impart movement to the contact disk member 52. When the temperature reaches a predetermined value as determined by the initial position of the contact disk member, it will electrically bridge the upper contact surfaces 102 of the contact elements 88 and 90 and thereby complete an electric circuit to the cooling device 108. Thus, the terminals 96 and 98 are electrically connected through a mode control switch assembly 110 to the cooling device 108. The switch assembly 110 may be displaced from the operative position shown in FIGURE 9 to the other operative position connecting the terminals 96 and 98 to a heating device 112. Thus, when the temperature drops to a low value, the fluid medium 106 will volumetrically contract so that downward axial displacement of the contact disk member 52 will again electrically bridge the contact elements 88 and 90 and then set the heating device into the operation. The switch device shown in FIGURES 6 and 9 may therefore control operation of both the cooling device 108 and the heating device 110 through a single conductive path. Also, should the temperature drop to an excessively low value because of some operational failure of the heating device for example, the contact elements 80 and 82 will close in order to complete an alarm circuit as aforementioned. It will therefore be observed from FIGURE 9, that the terminals 82 and 86 are electrically connected to an alarm device 114 for this purpose. The mode control switch assembly 110 may of course be eliminated by use of a switch device 10 such as illustrated in FIGURES 1 through 5 inasmuch as separate conductive paths are established in response to axial displacement of the contact disk member from its neutral position.

Referring now to FIGURE 7, a switch device is illustrated which again is basically similar in construction to the switch device 10. However, a modified form of rod 116 is utilized wherein the lower end portion 118 thereof is slidably received within a guide projection 120 formed in the modified form of base 122. The guide projection 120 also seats within the cylindrical housing, a spring element 124 which abuts the underside of the contact disk member 52 so as to impose an axial bias on the dielectric rod 116. Also mounted within the cylindrical housing, are the four parallel spaced support elements as described in connection with FIGURES 1 through 5. However, the support elements respectively mount modified forms of contact elements 126, 128, 130 and 132 having contact engaging surface portions 134 forming the axial ends of variable resistor coils 136. Accordingly, the conductive paths established between the terminals 22 and 24 and the terminals 20 and 22 respectively, will have a resistance value which decreases as the contact disk member is axially displaced by a greater amount in one direction or the other.

Referring now to FIGURE 10 it will be observed that the switch device described in connection with FIGURE 7 may establish two conductive paths in order to vary the speed of motors 138 and 140 respectively associated with cooling and heating devices. Thus, the switch device illustrated in FIGURE 7 may not only set into operation the cooling or heating device but may also regulate its operation in accordance with the degree to which cooling or heating is needed. Further, in view of the variable resistance of the conductive paths established, the cooling or heating demand may be monitored at a remote location. Accordingly, the terminals 24 and 22 in addition to being connected to the motors 138 and 140 are connected by the signal coupling capacitors 142 and 144 to remote indicators. Amplifiers 146 and 148 may be placed in the signal lines for this purpose as shown in FIG. 10.

As hereinbefore indicated, any suitable fluid medium may be utilized in connection with the different switch devices described. Where a relatively incompressible liquid such as oil is utilized, it will prevent sparking. In the switch constructions so far described, volumetric changes in the fluid medium were reflected by displacement of the elastically deformable closure cap, mounted on a relatively rigid housing portion. As a further modification, shown in FIGURE 8, the cylindrical housing portion 148 may be corrugated and secured to the relatively rigid, dielectric base 150 by means of fasteners 152, an annular sealing ring 154 being interposed between the lower flange portion 156 of the corrugated housing and the base. It will therefore be apparent, that volumetric changes in the fluid medium sealed within the housing portion 149, will cause axial displacement of the entire housing portion in order to impart axial displacement to the rod and contact disk member mounted thereon as aforementioned in connection with the other forms of switch devices.

FIGURE 11 illustrates yet another form of switch device 158 having a dielectric base 160 to which a relatively rigid housing 162 is secured by fasteners 164. The housing 162 also encloses a fluid medium such as oil 166 and is provided with an upper opening closed by an axially projecting piston chamber portion 168. The piston chamber portion 168 is closed by a cap 170 being vented to atmosphere by aperture 172. Slidably mounted within the piston chamber portion 168 is a piston member 174 the upper side of which is exposed to atmospheric pressure while the lower side is exposed to the pressure of the fluid 166 within the housing 162. Accordingly, the piston member 174 not only forms a closure for the housing 162 but directly senses variations in the volume of the fluid in order to axially displace a piston rod 176 connected thereto.

As more clearly seen in FIGURE 12, the piston rod 176 is made of a dielectric material and is externally threaded so as to mount in an adjustable position thereon, an internally threaded sleeve 178 made of a conductive material. Setscrew element 192 holds the sleeve 178 in its adjusted position on rod 176. Secured to the sleeve 178 as by welding, is a contact disk 180 to which a pair of contact spring portions 182 are secured. Also, the lower end of the contact sleeve 178 is guidingly received within a guide tube 184 mounted on and depending from the base 160. The base 160 mounts on either side of the guide tube 184, a pair of electrically interconnected terminals 186 and 188 which hold a pair of electrical brush elements 190 in wiping contact with the sleeve 178. Accordingly, an electrical connection is established with the contact disk member 180 in all axial positions thereof to which it is displaced by means of the piston member 176.

In its neutral position as illustrated in FIGURE 11, the contact disk member 180 will be spaced from a pair of variable resistor coil assemblies 194 and 196. The coil assemblies are supported in axially adjusted position concentrically surrounding the piston rod 176 and the sleeve 178 by means of the vertical, parallel spaced support elements 198 and 200. The support element 198 also establishes an electrical connection from the annular resistor assembly 194 to the electrical terminal 202 while the support element 200 establishes an electrical connection between the resistor assembly 196 and the terminal 204.

Referring now to FIGURE 13, it will be observed that the resistor assembly 194 may be electrically connected through its terminal 202 to a fan motor 206 associated with a cooling device for example. Thus, when the contact disk member 180 is upwardly displaced into contact with the resistor assembly 194, an energizing circuit may be completed for the motor 206. Toward this end, a DC source of electrical energy 208 is connected to the contact disk member 180 through the brushes 190. Similarly, the same source of electrical energy may be supplied to a heating device 210 when the contact disk member 180 is downwardly displaced into engagement with the other variable resistor assembly 196, connected by the terminal 204 to the heating device. Thus, the switch device 158 is capable of establishing two variable resistance paths when the temperature or pressure of the fluid 166 varies from a preset value.

The fluid 166 which fills the housing 162 may be derived from a heat exchanger 212 within which the fluid is stored as shown in FIGURE 11. The heat exchanger 212 is connected to the housing by opening the valve 214 so that the temperature of the fluid 166 will vary in rapid response to changes in the ambient temperature to which the heat exchanger is exposed. Operation of the switch device 158 will therefore be effected by changes in the volume of the fluid reflecting temperature variations. The temperature at which the contact member 180 assumes a position within the neutral zone between the resistor assemblies 194 and 196 may be adjusted by selectively changing the volume of the fluid 166 within the housing 162. This is accomplished by changing the volume of an accumulator chamber 218 connected by the conduit 220 and the T-coupling 222 to the conduit 216 which connects the housing to the heat exchanger. The volume of the chamber 218 is varied by means of a disk element 224 threadedly received within the internally threaded cylinder member 226. The disk element 224 is therefore rotated in order to change its axial position by means of an indicator pointer 228 which cooperates with a scale 230 in order to register its position corresponding to an adjusted position of the contact member 180 within the housing 162 of the switch device.

From the foregoing description, the construction, utility and operation of the various switch devices will be apparent. It will therefore be appreciated, that the switch devices are capable of sensing atmospheric changes in temperature or pressure by causing displacement of a housing closure member in response to volumetric changes in the fluid medium sealed within the housing by the closure member. The closure member whether it be the cap 42 or the piston member 174 is operative to displace a contact disk member adjustably positioned thereon so that the contact member may engage spaced contact elements. The contact elements are axially spaced so that displacement of the contact member in either direction will set into operation either a cooling device or a heating device as a response to the condition being sensed. Further, by utilizing variable resistors in association with the contact elements, the operation of the control device may be regulated in accordance with the degree to which it responds to the condition sensed and will be suitable for remote monitoring of the conditions. Also the construction of the switch devices are such as to permit external adjustment by rotation of an indicator pointer to change the position of the rod on the closure or to change the volume of the fluid within the switch housing by a measured amount. The axial position on the contact member in its neutral position between the contact elements may thereby be varied in order to change the response time of the switch device in order to favor either cooling or heating for example. The switch device may also be arranged to establish an alerting alarm in connection with extreme conditions that develop.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A condition sensing switch assembly comprising, a fixed base, a fluid-tight housing connected to said base enclosing a fluid medium, displaceable closure means mounted on said housing for sealing said fluid medium and displaceable in response to variations in pressure in said housing, a non-conductive rod operatively mounted on the closure means for axial movement and projecting into the housing, a contact member adjustably mounted on said rod, axially spaced contact means engageable by said contact member in response to displacement thereof from a neutral position by said rod, terminal means fixedly mounted on said base, and means for supporting the contact means in fixed relation within the housing establishing separate conductive paths between said contact means and the terminal means.

2. The combination of claim 1 wherein said rod is externally threaded and said contact member is a conductive disk element having a threaded aperture receiving said rod therethrough and means for biasing the rod in one axial direction.

3. The combination of claim 2 including means for varying the volume of said fluid medium within the housing.

4. The combination of claim 3 wherein said closure means includes a cap secured to the housing threadedly mounting said rod, said cap being made of an elastically deformable material, and indicator means secured to the rod externally of the housing for axial adjustment of the contact member to a position registered on a scale mounted on the cap.

5. The combination of claim 4 wherein said contact means includes at least one pair of contact elements adapted to be electrically bridged by the contact member.

6. The combination of claim 5 wherein said contact means further includes a resistor mounted on each of said contact elements to vary the resistance of said conductive path in response to said displacement of the closure means.

7. The combination of claim 6 including axially spaced contact surfaces formed on each of said contact elements for engagement by the contact member in response to displacement thereof in either direction from said neutral position.

8. The combination of claim 1 wherein said contact means includes two pair of contact elements, each pair of contact elements being electrically bridged by the contact member in response to displacement thereof from said neutral position in opposite directions, said supporting means establishing said separate conductive paths between each of said contact elements and the terminal means.

9. The combination of claim 8 wherein said contact means further includes a resistor mounted on each of said contact elements to vary the resistance of said conductive paths in response to said displacement of the closure means.

10. The combination of claim 1 including guide means mounted by the base and slidably receiving the rod, and spring means mounted by the base and engageable with the contact member.

11. The combination of claim 1 including a pair of yieldable contact elements mounted by the base in close spaced relation to each other, one of said contact elements being in engagement with the rod.

12. The combination of claim 1 wherein said housing is made of a corrugated material for axial displacement thereof in response to volumetric changes in the fluid medium.

13. The combination of claim 1 wherein said closure means comprises a piston chamber, a piston member slidably mounted in the chamber and connected to the rod on one side thereof exposed to the fluid medium within the housing, the chamber on the other side of the piston member being vented to atmosphere, said fluid medium being an incompressible liquid.

14. The combination of claim 1 including means for varying the volume of said fluid medium within the housing.

15. The combination of claim 1 including adjustment means mounted externally of the fluid-tight housing for positioning the contact member between said contact means axially spaced therefrom for a predetermined pressure of the fluid medium within the housing, and indicator means for registering the position of the contact member as adjusted by the adjustment means.

16. The combination of claim 15 wherein said adjustment means comprises an indicator pointer secured to the rod.

17. The combination of claim 15 wherein said adjustment means comprises, a fluid chamber connected to said housing, and means for selectively changing the volume of said fluid chamber to vary the volume of the fluid medium within the housing.

18. A condition sensing switch assembly comprising, a fixed base, a housing connected to said base enclosing a fluid medium, displaceable closure means mounted on said housing for sealing said fluid medium therein, a non-conductive rod operatively mounted on the closure means and projecting into the housing, a contact member adjustably mounted on said rod, contact means having axially spaced contact surfaces engageable by said contact member in response to displacement of said closure means, terminal means fixedly mounted on said base, and means for supporting the contact means in operative relation to the contact member within the housing and establish a conductive path between said contact means and the terminal means, said contact means comprising, a pair of axially spaced resistor coils through which said rod extends, said supporting means establishing two independent conductive paths between the respective resistor coils and the terminal means, and brush means electrically connecting the contact member to the terminal means.

19. The combination of claim 8 including amplifier means connected to said resistors for remotely monitoring fluctuations in the resistances of said conductive paths to register volumetric variations in the fluid medium.

References Cited
UNITED STATES PATENTS

| | | | |
|---|---|---|---|
| 2,443,252 | 6/1948 | Kelly | 338—39 |
| 2,911,606 | 11/1959 | Hoffman | 338—42 |
| 3,069,645 | 12/1962 | Henke | 338—39 |
| 3,153,715 | 10/1964 | Weisgerber | 200—83 X |
| 3,271,720 | 9/1966 | Hluchan et al. | 338—42 |

BERNARD A. GILHEANY, *Primary Examiner.*

H. B. GILSON, *Assistant Examiner.*